H. C. MILLER.
UNIVERSAL INDICATOR.
APPLICATION FILED JULY 19, 1915.

1,269,728.

Patented June 18, 1918.

INVENTOR.
Harold C. Miller.
BY John W. Mitchell
ATTORNEY

UNITED STATES PATENT OFFICE.

HAROLD C. MILLER, OF SAGINAW, MICHIGAN.

UNIVERSAL INDICATOR.

1,269,728.   Specification of Letters Patent.   Patented June 18, 1918.

Application filed July 19, 1915. Serial No. 40,806.

*To all whom it may concern:*

Be it known that I, HAROLD C. MILLER, of the city of Saginaw, in the county of Saginaw and State of Michigan, have invented certain new and useful Improvements in Universal Indicators, of which the following, taken in connection with the accompanying drawings, is a full, clear, and exact description.

This invention is an improved universal alinement indicator more especially designed for tool-makers' and machinists' use for testing the accuracy of various kinds of lathe and machine work, and operating when applied to the work to accurately and automatically show to what extent the work deviates or varies from a predetermined dimension, or is out of true.

The main object of the invention is to provide a more simple and effective device of universal application which may be attached to surfaces and places to be read while the work is in motion and so test a larger variety of work than heretofore practised.

Other objects and uses will be brought out in the following description, reference being made to the accompanying drawings forming a part of this specification, in which similar characters of reference indicate corresponding parts in all the figures.

Figure 1:
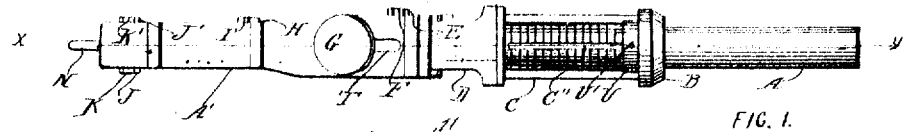
Figure 2:
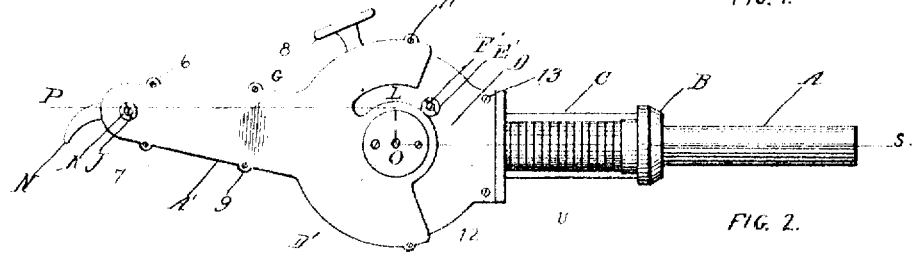
Figure 3:
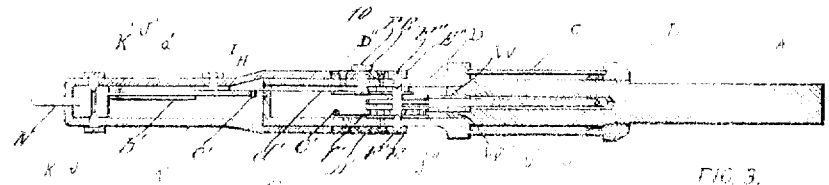
Figure 4:
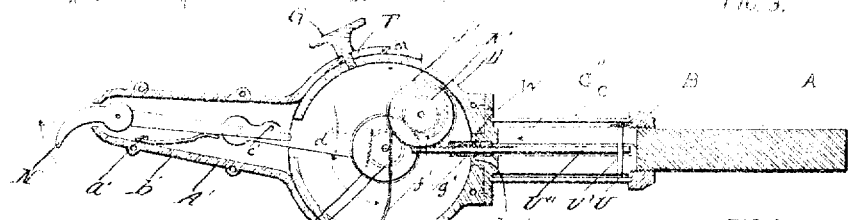
Figure 5:
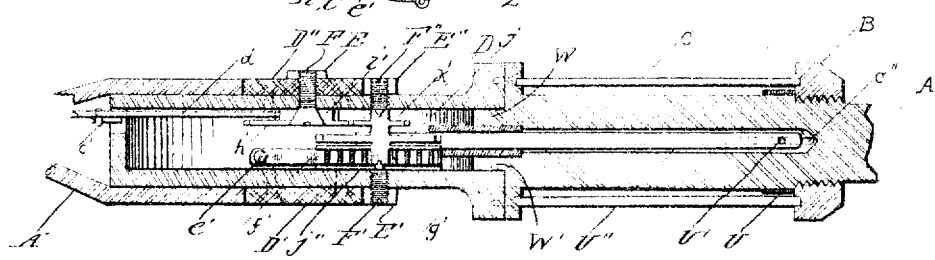

In the drawings Figure 1 is a plan view of an instrument embodying my invention; Fig 2, a front elevation; Fig. 3, a section on the plane P—L—O—S, shown in Fig. 2; Fig. 4, X section on the plane X—Y, shown in Fig. 1; Fig. 5 is an enlarged view of a portion of Fig. 3.

In Figs. 3 and 5 the hubs D' and D" are represented by crossed sectional lines. It is optional whether the hubs D' and D" in Figs. 3 and 5 be attached to the case D by screws or other means or be a part of said case D. The cross sectional lines shown at D' and D" are intended to represent this portion in Figs. 3 and 5. All internal working parts with the exception of the coiled spring *f'* Fig. 5, that fall on the section planes, are left plain for the sake of clearness.

Briefly stated, the machine comprises a shank which has one end squared and is made to fit and hold a case or frame. Another case or frame is fastened to this case which is free to rotate about the same. The indicating mechanism comprises an index or pointer with a sleeve attached thereto and a lever or feeler with intervening mechanism whereby any movement of the lever is passed on to the index and sleeve.

Reference to the drawings shows the construction of the indicator to be as follows: A round shank A, having one end squared, shown at W and W' is machined to fit and hold the case D. This shank A may be held in the jaws of a milling machine chuck, or clasped in or to a tool-post of a lathe or other device. Hinged on the hubs D' and D" (which as already indicated may be either a part of or fastened to the case D) and free to rotate about the same, is the case A'. The extremities of the parts A and A' form a means for adjusting the casings relatively to each other. This adjustment may be effected by taking these extremities one in each hand and moving the one casing with respect to the other. The casings may then be locked in different positions by means of the thumb screw G, which is screwed into case D and works in the slot T, Fig. 1. Both of the above mentioned cases, A' and D are made of two parts held together by screws or other means, as indicated at points 6, 7, 8, 9, 10, 11, 12, and 13. The lever N, Fig. 3, swings on the pointed screws K and K' which are locked by the nuts J and J'. The spring *b'* which is fastened to the bottom of case A' by means of the small screw *a'* holds said lever or feeler N in proper position, as shown in Fig. 4. Said spring *b'* exerts a stronger pressure than the coiled spring *f'* hereinafter described. Lever *d'* swings on the tapered screw I, which is locked by nut H. The pin *c'* is fastened in such position in lever *d'* as to rest on top of lever or feeler N. Gear teeth are cut in the end of lever *d'* opposite the tapered screw I. Said gear teeth mesh with the gear *i'*, more clearly shown in Fig. 5. Fastened to gear *i'*, and rotating about the same axis, is the larger gear *h'*. These gears, *i'* and *h'*, swing on the tapered screw F, which is locked by the nut E. Meshing with the larger gear *h'* is the small gear *k'*, which is mounted on a spindle carrying the large gear *j'* and the drum *j"* about which is wound the coiled spring *f'*, which is fastened at one end to the drum *j"*, and at the other end to the case D by means of the small screw *e'*. The spindle upon which the gears *k'* and *j'* and the drum *j"* are mounted swings on the screws F' and F", which are locked by the nuts E' and E''. An index U'' works lengthwise in the hole drilled in the shank A which is bushed at g' Fig. 5. At one end of said index U'' a rack is cut which meshes with the large gear j'. At the other end of said index U'' a hole is drilled at right angles to its axis, through which hole a pin U' passes, connecting the index U'' with the sleeve U, by passing through same. A slot C'' is cut in shank A to accommodate the pin U'. A glass tube C may inclose that portion of shank A in which the slot C'' is cut, being held in position by the nut B. Upon that portion of shank A which is inclosed by the tube C lines are etched or cut a suitable distance apart and at right angles to the axis of said shank A. Each line passes completely about the circumference of said shank A and is broken only by the slot C''. The coiled spring f' in Fig. 4 is shown broken at Z—so as not to interfere with the drawing of the gearing. Said spring is so coiled as to bring tension against lever or feeler N at the point where pin c' rests on said lever N. Therefore, any movement of the lever N, in the direction of the arrow, Fig. 4, will be followed by a movement of the lever d'' and the gears i'', H' and j' as the corresponding arrows indicate in Fig. 4.

It is obvious that the index U'' will then travel or move toward lever N, bringing with it the sleeve U. It will readily be seen that should the indicator be held in the jaws of a milling machine chuck, or other appropriate machine or appliance, and the lever N be brought in contact with a shaft or any round object, and the milling machine or other machine or appliance be set in motion so that the point of lever or feeler N revolves about said shaft, or other round object, any variation of alinement between the axes of said machine and said shaft will at once be shown by a movement of sleeve U. Sleeve U being round to fit shank A, and having its ends faced true and at right angles to its axis will pass back and forth over the lines heretofore mentioned, which are cut or etched about shank A.

Thus it will be seen that any variation of alinement may be read while the indicator is revolving continuously, and to true up the work the operator needs only to grasp the handles of the machine upon which the work is mounted and adjust the same until the sleeve U comes to a rest, when a perfect alinement will have been found.

The above applications of my indicator show the utility of the device. it is however apparent that many other uses will in practice be found which are not mentioned herein.

Various changes within the scope of the invention as defined in the following claims may be made in the particular construction of the clamping fixtures and also in the shape and organization of the active members of the indicator without departing from the spirit of the invention.

This indicator may be used in milling machines, lathes, shapers or in any other machine requiring a measuring device to ascertain and maintain a given or predetermined location or shape of work.

Having thus described my invention, I claim as new and desire to secure by Letters Patent:

1. In a device of the kind described, two casings, one of said casings being provided with circular recesses, hubs carried by the other casing and extending into the recesses, whereby pivotal adjustment of the two casings is obtained, means for adjustably securing the two casings together, a feeler carried by one of the casings, an index carried by the other casing, and an operative connection between the feeler and the index, substantially as described.

2. In an indicator of the character described, an index, means for moving the same, a lever, gear means operatively connecting said lever and index, a pin carried by said lever, a feeler member, and means for moving the feeler member into engagement with said pin for reversing the motion of the said index, substantially as described.

3. In an indicator of the character described, a feeler, a lever, a reciprocating index, gear means operatively connecting said lever and index, and means for yieldingly opposing the operation of the said means, substantially as described.

4. In an indicator of the character described, a reciprocating index, means for normally moving the index in one direction, a spring operated pivotally mounted feeler normally preventing the said means from operating, and gear means operatively connecting the said index and feeler, substantially as described.

5. In an indicator of the character described, a casing provided with hubs, an index carried thereby, a second casing pivotally mounted upon the hubs, means for securing the casings in adjusted positions, a feeler carried by the said second casing, and gear means connecting the index and the feeler whereby motion of the feeler causes a resultant motion of the index, substantially as described.

6. In an indicator of the character described, an index, a rack carried thereby, a gear meshing with the said rack and having a second gear coaxial therewith, a third gear operated by the said coaxial gear, a fourth gear coaxial with said third gear, a lever operated by the said fourth gear, and a feeler normally opposing the motion of the said lever, substantially as described.

7. In an indicator of the character described, a frame, a reciprocating index carried thereby, a feeler pivotally mounted within said frame, gear means interconnecting said index and feeler, and means normally tending to actuate the said feeler to oppose the motion of said index, substantially as described.

8. In an indicator of the character described, a casing, a feeler pivoted to the casing, a reciprocating index provided with a rack extending into said casing, gear means in said casing engaging said rack, a drum carried by the said gear means, and a coiled spring fastened to the drum and to the casing to operate the said gear means, substantially as described.

9. A test indicator comprising two casings each having a partly circular portion, the circular portion of one casing being partly inclosed within the partly circular portion of the other, the circular portions permitting relative adjustment of the casings, an index carried by one of the casings, means within said casing for operating the said index, a feeler carried by the second casing and normally opposing the motion of the said index, means operatively connecting the feeler with the index, and means for securing the casings in an adjusted position.

10. A test indicator comprising a casing, an index carried thereby, gear mechanism for moving the said index, spring means for operating the said mechanism, a second casing pivotally mounted upon the first casing, means for securing the casings in adjusted position, a lever carried by the said second casing and also operated by said gear mechanism, and a feeler member carried by the said second casing and normally opposing the motion of the said index.

11. A test indicator comprising an index, a lever, gear means operatively connecting said index and lever, means for moving the index, and a spring operated feeler normally opposing the motion of the lever and thereby preventing the said means from operating, substantially as described.

12. A test indicator comprising a casing, a reciprocating index carried thereby, a feeler pivoted to the casing, means in the casing normally actuating the feeler to oppose the motion of the index, substantially as described.

13. In a test indicator of the character described, a casing, an index extending thereinto, gear means engaging said index, a spring fastened to the gear means and casing to operate the gear means, a feeler, and means operatively connecting the feeler and said gear means, substantially as described.

14. A test indicator comprising a casing, an index extending thereinto, gear means engaging said index, a spring fastened to the gear means and casing to operate the gear means, a feeler, and means engaging the feeler to oppose the operation of the spring, substantially as described.

15. A test indicator comprising a casing, an index carried thereby, a rack carried by the index, gear mechanism for moving the rack, spring means for operating the said mechanism, a second casing pivotally mounted upon the first casing, means for securing the casings in adjusted position, a lever carried by the said second casing, a circular rack carried thereby and meshing with one of the gears, a pin carried by said lever, a feeler member carried by said second casing, and a spring actuating the feeler member to engage the pin and thereby oppose the motion of the said index, substantially as described.

In testimony whereof I have hereunto set my hand in the presence of two subscribing witnesses.

HAROLD C. MILLER.

Witnesses:
A. C. SEIFERT,
A. E. WESTON.